Sept. 29, 1964 P. M. CONNAUGHT 3,150,674
PNEUMATIC THYRATRONS
Filed Dec. 28, 1961 3 Sheets-Sheet 1

INVENTOR
PHILLIP M. CONNAUGHT
BY Herbert M. Birch
ATTORNEY

INVENTOR
PHILLIP M. CONNAUGHT
BY Herbert M. Birch
ATTORNEY

Sept. 29, 1964 P. M. CONNAUGHT 3,150,674

PNEUMATIC THYRATRONS

Filed Dec. 28, 1961 3 Sheets-Sheet 3

INVENTOR
PHILLIP M. CONNAUGHT

BY Herbert M. Birch
ATTORNEY

United States Patent Office 3,150,674

Patented Sept. 29, 1964

3,150,674

PNEUMATIC THYRATRONS

Phillip M. Connaught, King of Prussia, Pa., assignor to Robertshaw Controls Company, a corporation of Delaware Filed Dec. 28, 1961, Ser. No. 162,865

21 Claims. (Cl. 137—82)

This invention relates to pneumatic control devices and more particularly, to pneumatic switching devices which are analogous to and have substantially identical characteristics as an electronic thyratron.

It is an object of this invention to provide a pneumatic device having structure which is a mechanical analog of an electronic thyratron.

Another object of this invention is to provide a pneumatic control device having substantially the same control and output charcteristics with respect to pneumatic circuitry as an electronic thyratron has with respect to electric circuitry.

Still another object of this invention is to provide a pneumatic control device which is capable of such functions as pneumatic memory and power switching.

These and other objects of this invention will become apparent with reference to the following specification and drawings.

Figure 1:
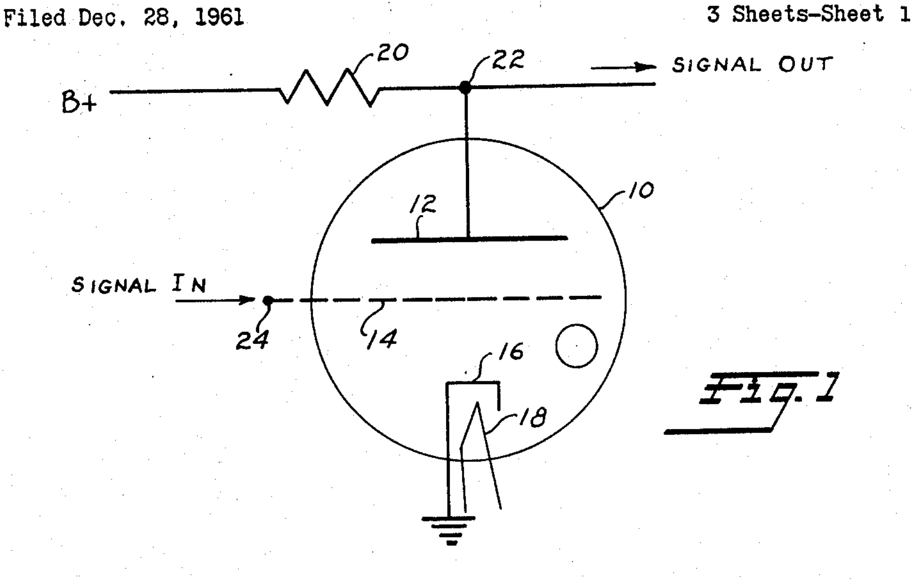
FIGURE 1 is a schematic diagram of an electronic thyratron circuit which is analogous to the pneumatic control means of the present invention.

Referring in detail to the drawings and more particularly to FIGURE 1, an electronic thyratron circuit with its attendant characteristics will first be described to clearly set forth the analogous characteristics provided by the present invention.

The thyratron 10 is shown as including a plate 12, a grid 14 and a cathode 16, the cathode being provided with a heater element 18. As shown, the cathode 16 is connected at ground potential while the plate 12 is connected through a plate load resistor 20 to a positive bias as indicated. A junction 22 is provided between the load resistor 20 and the plate 12 which comprises a signal output terminal for the thyratron 10. Input signals to the thyratron 10 are brought in through the input terminal 24 on the grid 14.

In operation, since the thyratron 10 is a gas filled electronic device, a small electron current flow from the cathode 16 to the plate 12 is sufficient to initiate an ionization of the gas in the said thyratron. Upon ionization of the gas the plate-to-cathode resistance of the thyratron 10 is decreased and the electron current flow is increased as a result. These two factors combine to provide an avalanche effect in the increase in current flow.

The initiation of the ionization is controlled by the input bias signal at the terminal 24 of the grid 14, the magnitude of the input bias signal depending on the operating bias and parameters of the thyratron 10.

The following characteristics of an electronic thyratron, such as that described with reference to FIGURE 1, which are the analogous characteristics of the present invention are as follows:

(1) The operating point or firing point of the thyratron varies with the bias on the plate circuit.

(2) The deionization or discharge time of the thyratron is much greater than the ionization or firing time.

(3) The input bias signal may either be a pulse or a constant signal to cause the thyratron to fire.

(4) Control of the thyratron by the use of grid bias signals is lost once the thyratron fires. Conduction in the gas therein may only be interrupted by removal of the plate bias supply or by a large negative pulse on the grid.

Before commencing the description of the several embodiments of the invention, the following essential analogies, with reference to the present invention between electrical and pneumatic devices should be noted:

| Electrical | Pneumatic |
|---|---|
| Cathode | Reference pressure. |
| Plate | Nozzle. |
| Grid | Diaphragm. |
| Resistor | Restriction. |
| Voltage bias | Pressure bias. |

Figure 2:
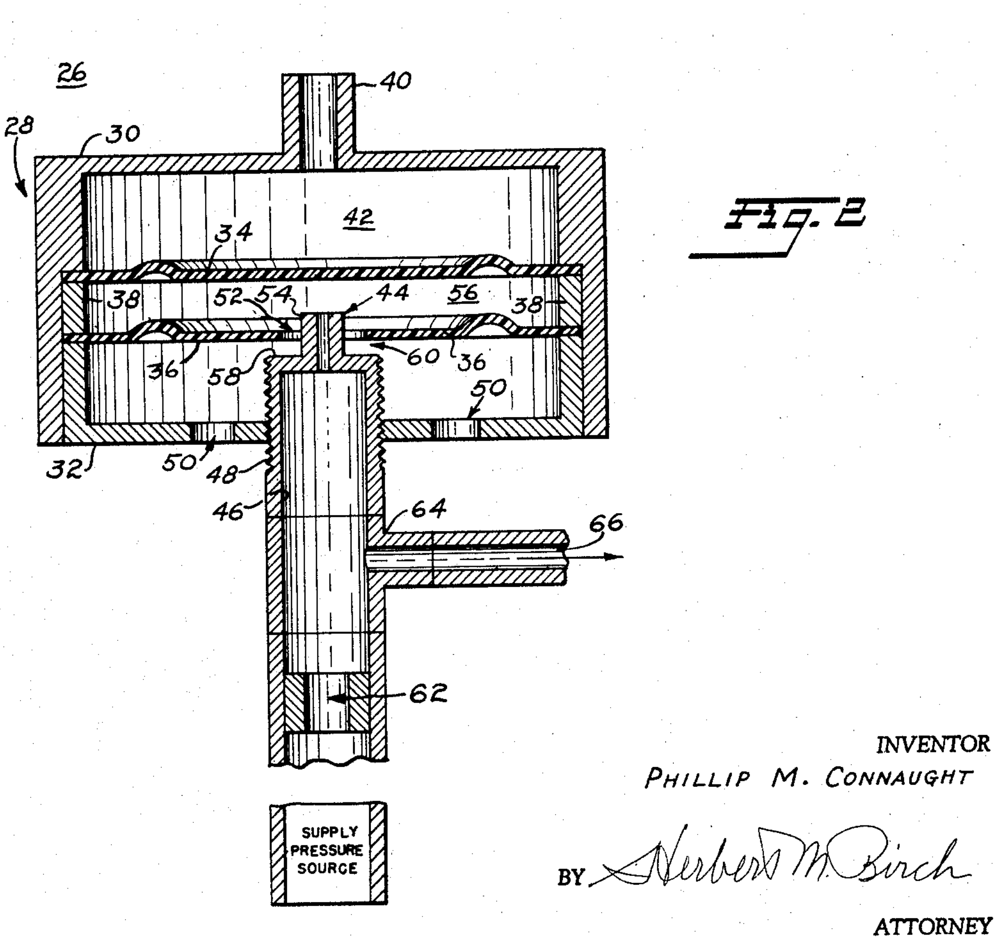
FIGURE 2 is a schematic diagram of one embodiment of the invention.

Referring now to FIGURE 2, the first embodiment of the present invention will be described.

The pneumatic thyratron 26 is shown as including a cylindrical housing 28 having upper and lower coaxial interconnected portions 30 and 32, respectively. Press fitted in spaced apart relationship between the respective upper and lower housing portions 30 and 32, is a pair of flexible substantially parallel diaphragms comprising an upper diaphragm 34 and a lower diaphragm 36 spaced apart at their peripheral edges by a spacer member 38. These diaphragms are analogous, as set forth above, to a control grid.

A grid input terminal for the pneumatic thyratron 26 is provided by a signal pressure input port 40 in the upper housing portion 30 which, with the upper diaphragm 34, forms a control chamber 42 whereby a grid bias signal pressure may be applied to the diaphragms 34 and 36 as will be hereinafter described. The grid signal input port 40 is connected to a suitable source of pressure (not shown) to which the pneumatic thyratron 26 is to be responsive.

The equivalent to a plate for the pneumatic thyratron comprises a nozzle 44 in the end of a pressure tube 46 which is adjustably threaded at 48 through the center of the lower housing portion 32, hereinafter referred to as the cathode housing 32. The cathode housing is vented to atmosphere by way of a pair of cathode exhaust ports 50.

The nozzle 44 extends upward through a central orifice 52 in the lower grid diaphragm 36. The nozzle 44 comprises a reduced tubular portion 54 extending from the pressure tube 46 and coaxial therewith through the orifice 52 into the chamber 56 between the grid diaphragms 34 and 36 and a flat shoulder 58 concentric with and located at the base of the reduced tubular portion 54 of the nozzle 44.

The flat shoulder 58 on the nozzle 44 provides a seating surface for the lower diaphragm 36 whereby the orifice 52 therein may be sealed to close off the chamber 56 between the diaphragms 34 and 36. The cooperation between the orifice 52 in the lower diaphragm 36 and the extended tubular portion 54 and flat shoulder 58 on the nozzle 44, all cooperate to variably restrict the flow of air or other pneumatic fluid from the chamber 56 into the cathode housing 32 and out to atmosphere via the exhaust ports 50. This combination of elements will be hereinafter referred to as the cathode restriction 60.

The pressure tube 46 is connected with a suitable pressure bias supply (not shown) and includes a load restriction 62 between the said pressure bias supply and the plate nozzle 44.

A T-connection 64 in the pressure tube 46 between the load restriction 62 and the plate nozzle 44 provides a pressure output signal line 66 which may be connected to a suitable pressure receiver (not shown).

Figures 3, 4:
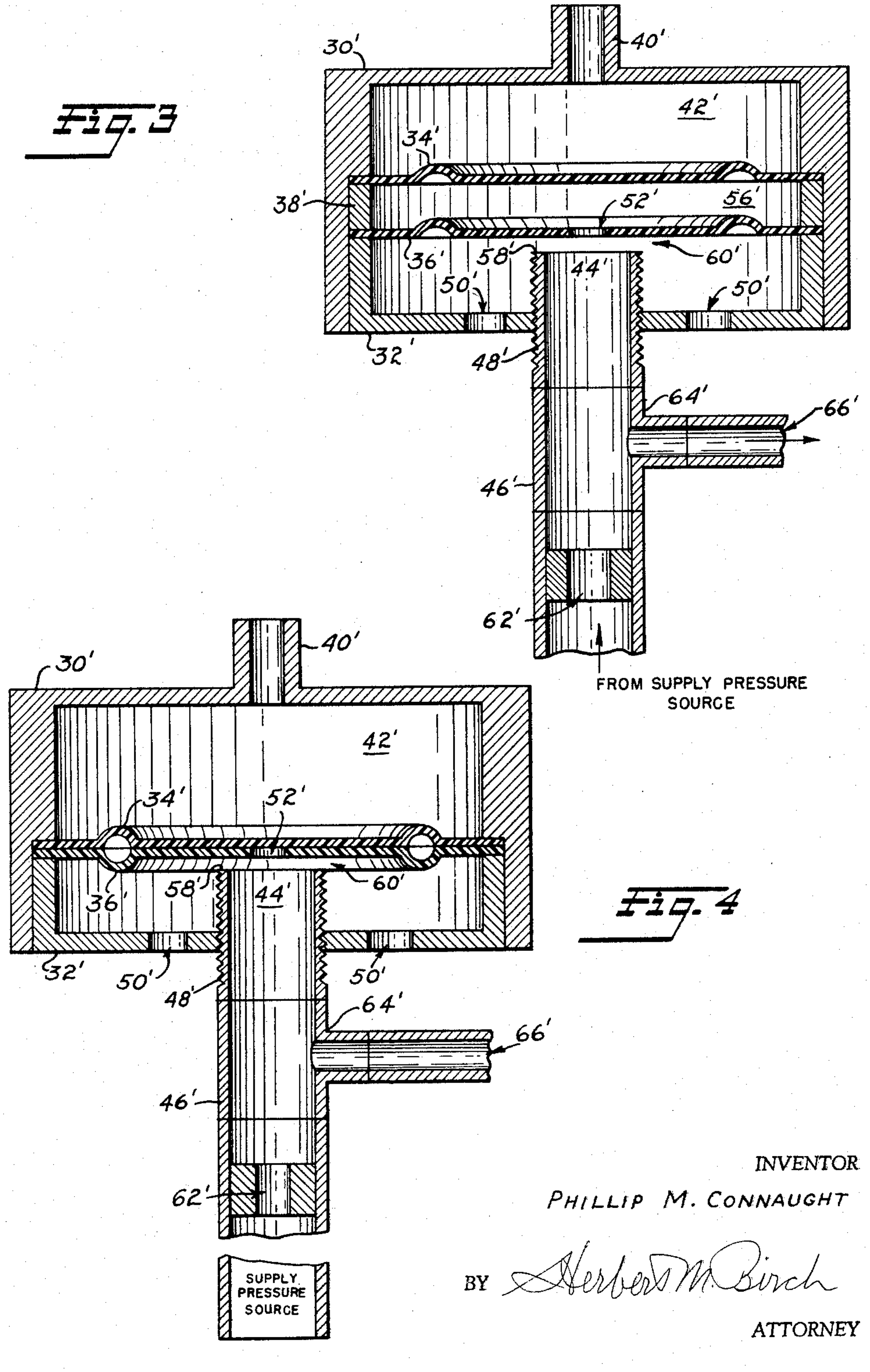
FIGURE 3 is a schematic diagram of a second embodiment of the invention.
FIGURE 4 is a schematic diagram of a third embodiment of the invention.

Referring now to FIGURE 3, the second embodiment of the invention is shown, which is basically the same as the first embodiment of FIGURE 2 except for a major modification to be hereinafter described, with like elements to the said first embodiment being designated by like primed numerals.

The said major modification herein is made in the cathode restriction 60' and comprises eliminating the restricted tubular portion of the plate nozzle 44', whereby the nozzle 44' comprises the open end of the pressure tube 46' and making the orifice 52' in the lower diaphragm 36' of a size small enough to be internally concentric with the nozzle 44' when the said lower diaphragm 36' seats on the flat nozzle shoulder 58', said shoulder 58' now comprising the end face of the walls of the pressure tube 46'.

The third embodiment of the invention, which is shown in FIGURE 4, substantially comprises the said second embodiment of FIGURE 3 and bears on all parts thereof the identical primed numerals of that embodiment. The essential difference between the two is that the spacer 38' between the upper and lower diaphragms 34' and 36', respectively, has been removed and the lower diaphragm 36' is now inverted permitting the upper diaphragm 34' to seat thereon. With pressure removed from the bias signal inlet port 40' so that the control chamber is exhausted, the upper diaphragm is designed to bow upward slightly to provide, as before, a chamber 56' between the two diaphragms. This will be further described with respect to the operation of FIGURE 4.

Figures 5, 6:
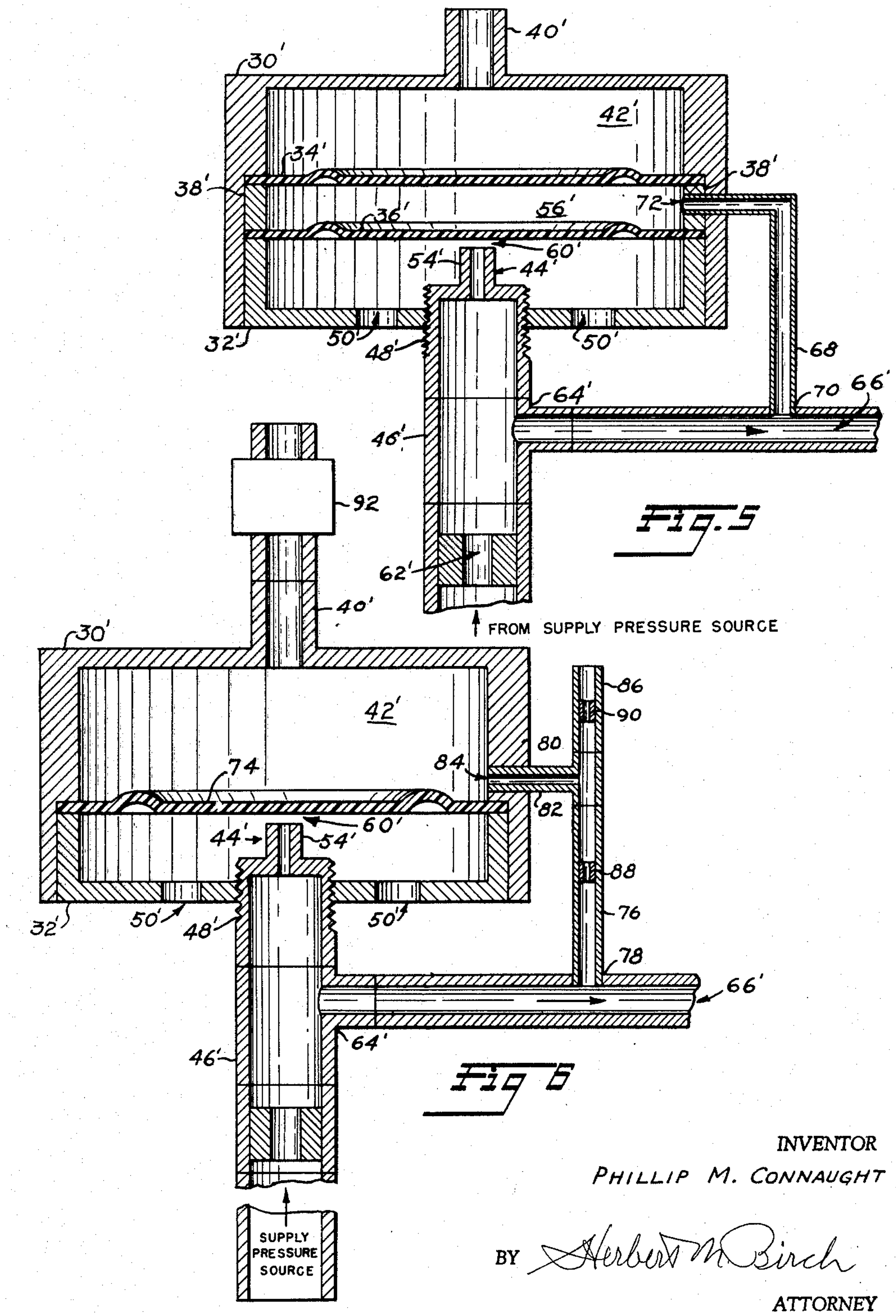
FIGURE 5 is a schematic diagram of a fourth embodiment of the invention.
FIGURE 6 is a schematic diagram of a fifth embodiment of the invention.

A fourth embodiment of the present invention is shown in FIGURE 5. In this embodiment, the nozzle structure 44' includes the elongated tubular nozzle restriction 54' of the embodiment of FIGURE 2. However, there is no central orifice in the lower diaphragm 36' which, in this embodiment, is of an identical structure with the upper diaphragm 34' to form, with the spacer 38', a closed chamber 56' between the said diaphragms.

The cathode restriction 60' in this embodiment now comprises the flow restriction provided on the fluid exhausting from the nozzle 44' by the action of the lower surface of the lower diaphragm 36'.

An additional element in this embodiment comprises a pressure feedback tube 68 extending from a T-connection 70 in the pressure output signal line 66' which extends from the said output signal line 66' into the closed chamber 56' between the grid diaphragms 34' and 36' via a feedback port 72 in the diaphragm spacer 38'. Thus, the output pressure in the output line 66' may be fed back to the diaphragm chamber 56' for a control purpose to be hereinafter defined in the description of the operation of this embodiment.

The fifth and final embodiment of the present invention illustrated herein is shown in FIGURE 6.

In this embodiment, only a single grid diaphragm 74 is used along with the plate nozzle 44' of FIGURE 5 to form a cathode restriction 60' identical with that formed with the lower diaphragm 36' and the nozzle 44' in FIGURE 5.

A feedback tube 76 extends from a first T-connection 78 in the signal output line 66' to a second T-connection 80 having one branch 82 connected, via a feedback port 84 in the grid or upper housing 30', to feed back a selected portion of the output signal pressure to the grid control chamber 42'. The other branch 86 of the second T-connection 80 is vented to atmosphere.

The desired pressure feedback ratio is determined by means of first and second feedback pressure restrictions 88 and 90, respectively, located one in the feedback line 76 between the branch 82 and the output line 66' and the other in the exhaust end of the said other branch 86 in the second T-connection 80. These restrictions form a pressure divider whereby a desired fraction of the output signal pressure in the output line 66' may be transmitted to the grid control chamber 42' via the feedback port 84.

In this embodiment, it is necessary to place a pressure diode 92 comprising any adaptable unidirectional flow valve, i.e., a check valve, at the grid signal inlet port 40' to prevent any reverse flow of pressure fluid from the grid control chamber 42' through the inlet port 40' as will be further described with respect to the operation of this embodiment.

*Operation*

Referring now to FIGURE 2, the operation of the embodiment shown therein is as follows:

A supply of pressurized air is connected to the pressure tube 46 through the load restriction 62 therein and hence, to the plate nozzle 44.

The nozzle restriction in the nozzle end 54 and the cathode restriction 60 act as a pressure divider, whereby the pressure in the chamber 56 between the grid diaphragms 34 and 36 is maintained slightly higher than atmospheric pressure. Also, the load restriction 62 in the pressure tube 46 is chosen so that almost all of the supply pressure is dropped thereacross. Thus, when no bias pressure signal has been applied at the grid signal inlet port 40, the pressure transmitted through the output line is substantially zero for purposes of calibration.

In order to fire or activate the pneumatic thyratron 26, a suitable pulse of air pressure is introduced into the grid bias signal inlet port 40 in the upper housing 30 to create a pulsed pressure increase in the grid control chamber 42. This pulse initially pushes the upper grid diaphragm 34 towards the lower grid diaphragm 36 which gives rise to a slight increase in pressure in the chamber 56 between the two diaphragms.

This increase in pressure in the chamber 56 causes the lower diaphragm 36 to approach the flat shoulder 58 on the nozzle 44, whereby an increase in the resistance to the flow of air from the chamber 56, through the cathode restriction 60, into the cathode housing 32 and out through the cathode exhaust ports 50 is effected. This increase in flow resistance at the cathode restriction 60 causes a further increase in pressure in the chamber 56, whereby the lower diaphragm 36 is subsequently forced into contact with the flat shoulder 58 on the nozzle 44 to seal off the diaphragm orifice 52 and thereby close the cathode restriction 60.

Now that the flow of air from the nozzle 44 through the cathode restriction 60 is completely interrupted and all of the supply pressure is now transmitted through the output signal line 66, the pneumatic thyratron will remain in this activated or fired state until the supply pressure is removed from the plate nozzle 44 or the output signal line 66 is vented to atmosphere or a large negative pulse analogous to a vacuum is introduced into the grid housing 42.

Referring now to FIGURE 3, the embodiment shown therein will operate in substantially identical fashion to the embodiment of FIGURE 2, since the open end of the plate nozzle 44' will cause some air to be forced through the diaphragm orifice 52' into the chamber 56' whereby the increase in pressure in the chamber 56' plus a pressure pulse at the grid bias inlet port 40' will cause the lower diaphragm 36' to seat on the shoulder 58' of the nozzle 44' and close the cathode restriction 60'. This, as described with respect to FIGURE 2, will cause the pressure in the output signal line 66' to rise to substantially the value of the supply pressure.

An alternative method of operation for the embodiment of FIGURE 3 would be to position and choose the diaphragms 34' and 36' such that an input pressure pulse to the grid inlet port 40' would force the upper diaphragm 34' against the lower diaphragm 36', whereby the closing of the cathode restriction 60' would be effected.

This particular embodiment permits the use of less impedance to flow in the load restriction 62' due to the low flow impedance of the particular cathode restriction 60 used therein. This permits a large current flow to the signal output line 66'. A flow switching function, analogous to current switching, is thereby provided by this embodiment as opposed to a pressure switching function, analogous to voltage switching, as provided by the embodiment of FIGURE 2.

Referring now to FIGURE 4, the operation of the embodiment shown therein is substantially identical with the above described operation of the embodiment of FIGURE 3.

Referring now to FIGURE 5, the operation of the embodiment shown therein will be described.

Since neither of the two grid diaphragms 34' nor 36' are ported, a pressure signal pulse into the grid signal inlet port 40' will cause the air pressure in the chamber 56' between the two grid diaphragms to rise slightly and force the lower diaphragm 36' toward the tip of the nozzle 44'. The resulting closer proximity of the diaphragm 36' to the outlet of the nozzle 44' causes an attenuation of the flow of air from the nozzle at the cathode restriction 60'. A resulting back pressure is generated in the pressure tube 46 and thus, transmitted to the signal output line 66'.

The increase in output signal pressure in the output line 66' is transmitted by the feedback tube 68 back into the chamber 56' between the diaphragms 34' and 36' via the feedback port 72 in the spacer 38' to further increase the pressure in the chamber 56' and effectively cause a closing of the cathode restriction 60' by forcing the lower diaphragm 36' into tight engagement with the tip of the plate nozzle 44'.

This causes the pneumatic thyratron to enter the fired or fully active state wherein the pressure at the output signal line 66' is substantially equal to the supply pressure.

Referring now to FIGURE 6, while only a single diaphragm 74 is used in place of the two diaphragms 34' and 36' of FIGURE 5, the operation of this embodiment is substantially identical with that of FIGURE 5.

An input pressure pulse to the pneumatic diode 92 into the grid signal inlet port 40' forces the diaphragm 74 toward the nozzle 44' whereby the flow attenuation at the cathode restriction 60' and the resultant pressure rise in the output signal line 66' are effected as described with reference to FIGURE 5.

This increase in output pressure causes a change in pressure drop across the pressure divider comprising the two restrictions 88 and 90 in the feedback tube 76. This change is detected via the branch 82 and feedback port 84 to increase the pressure in the diaphragm control chamber 42; whereby the diaphragm 74 is further forced into contact with the nozzle 44' to effectively close the cathode restriction 60'. As previously described with reference to the embodiment of FIGURE 5, the output signal pressure in the output line 66' will now rise to a value approaching that of the supply pressure.

In all of the foreging embodiments, the pneumatic thyratron is returned to a quiescent or de-activated state by either removing the supply pressure from the plate nozzle 44' or venting the output signal line 66 to atmosphere or by introducing a large negative pulse to grid chamber 42.

As can be seen from the foregoing specification and drawings, this invention provides new and novel pneumatic switching devices wherein the operation and the characteristics thereof are analogous to those of electronic thyratrons.

It is to be understood that the embodiments shown and described herein are for the purpose of example only and are not intended to limit the scope of the appended claims.

What is claimed is:

1. A pneumatic control device comprising a housing, flexible diaphragm means in said housing forming a chamber therewith, input means supplying a pressure impulse to said chamber, nozzle means exterior to said chamber immediately adjacent said diaphragm means impinging a flow of pneumatic fluid on said diaphragm means, a source of supply pressure connected with said nozzle means, a flow restriction between said pressure source and said nozzle, a pressure tube connecting said nozzle with said flow restriction, a pressure outlet signal port in said pressure tube between said flow restriction and said nozzle, and means responsive to movement of said flexible diaphragm means toward said nozzle in response to a pressure pulse in said chamber from said input means to further move said diaphragm means into sealing engagement with said nozzle to prevent the further flow of fluid therefrom and thereby cause the pressure at said pressure signal outlet port to rise to substantially the value of said supply pressure.

2. The invention defined in claim 1, wherein said flexible diaphragm means comprises a first diaphragm defining said chamber and a second diaphragm spaced from said first exteriorly of said chamber including an orifice therein adjacent said nozzle.

3. The invention defined in claim 2, wherein said means responsive to movement of said flexible diaphragm means comprises a variable flow restriction defined by said nozzle and said orifice.

4. The invention defined in claim 2, wherein said means responsive to movement of said flexible diaphragm means comprises a variable flow restriction defined by said noz-ble and said orifice, said nozzle comprising an elongated outlet portion extending through said orifice to a position between said first and second diaphragms and a shoulder at the base of said outlet portion providing a seating surface for said second diaphragm adjacent the periphery of said orifice.

5. The invention defined in claim 2, wherein said means responsive to movement of said flexible diaphragm means comprises a variable flow restriction defined by said nozzle and said orifice, said nozzle comprising substantially the open end of said pressure tube adjacent and symmetrically disposed with respect to said orifice and a seating surface for said second diaphragm comprising the end face of the said pressure tube, the relative dimensions between said orifice and said pressure tube being such that said end face is externally concentric with said orifice when said diaphragm is seated thereon.

6. The invention defined in claim 2, wherein said second diaphragm is substantially flush with said first diaphragm, said first diaphragm being slightly bowed away from said second in the vicinity of said orifice.

7. The invention defined in claim 2, wherein said second diaphragm is substantially flush with said first diaphragm, said first diaphragm being slightly bowed away from said second in the vicinity of said orifice, and wherein said means responsive to movement of said flexible diaphragm means comprises a variable flow restriction defined by said nozzle and said orifice.

8. The invention defined in claim 2, wherein said second diaphragm is substantially flush with said first diaphragm, said first diaphragm being slightly bowed away from said second in the vicinity of said orifice, and wherein said means responsive to movement of said flexible diaphragm means comprises a variable flow restriction defined by said nozzle and said orifice, said nozzle comprising substantially the open end of said pressure tube adjacent and symmetrically disposed with respect to said orifice and a seating surface for said second diaphragm comprising the end face of the said pressure tube, the relative dimensions between said orifice and said pressure tube being such that said end face is externally concentric with said orifice when said second diaphragm is seated thereon.

9. The invention defined in claim 1, wherein said flexible diaphragm means comprises a first diaphragm defining said chamber and a second diaphragm spaced from said first exteriorly of said chamber and forming a second chamber with said first diaphragm.

10. The invention defined in claim 9, wherein said means responsive to movement of said flexible diaphragm means comprises a variable flow attenuator defined by said nozzle and said second diaphragm and feedback means between said signal outlet port and said second chamber for varying the pressure in said second chamber in response to a variation in pressure at said signal outlet.

11. The invention defined in claim 10, wherein said nozzle comprises a restricted flow outlet adjacent the exterior surface of said second diaphragm whereby movement of said second diaphragm toward and away from said nozzle variably attenuates the flow of pressure fluid therefrom, thereby varying the back pressure in said pressure tube and hence, at said pressure signal outlet port, in response to the movement of said second diaphragm.

12. The invention defined in claim 10, wherein said feedback means comprises pressure transmitting means extending from a point adjacent to and at the same pressure as said signal outlet port to the interior of said second chamber.

13. The invention defined in claim 10, wherein said nozzle comprises a restricted flow outlet adjacent the exterior surface of said second diaphragm whereby movement of said second diaphragm toward and away from said nozzle variably attenuates the flow of pressure fluid therefrom, thereby varying the back pressure in said pressure tube and hence, at said pressure signal outlet port, in response to the movement of said second diaphragm, and wherein said feedback means comprises pressure transmitting means extending from a point adjacent to and at the same pressure as said signal outlet port to the interior of said second chamber.

14. The invention defined in claim 1, wherein said flexible diaphragm means comprises a single diaphragm.

15. The invention defined in claim 1, wherein said input means comprises a pressure diode.

16. The invention defined in claim 15, wherein said means responsive to movement of said flexible diaphragm means comprises a variable flow attenuator defined by said nozzle and said diaphragm means and feedback means between said signal outlet port and said chamber for varying the pressure in said chamber in response to a variation in pressure at said signal outlet.

17. The invention defined in claim 16, wherein said nozzle comprises a restricted flow outlet adjacent the exterior surface of said diaphragm means, whereby movement of said second diaphragm toward and away from said nozzle variably attenuates the flow of pressure fluid therefrom, thereby varying the back pressure in said pressure tube and hence, at said pressure signal outlet port, in response to the movement of said second diaphragm.

18. The invention defined in claim 16, wherein said feedback means comprises pressure transmitting means extending from a point adjacent to and at the same pressure as said signal outlet port to the interior of said chamber.

19. The invention defined in claim 16, wherein said nozzle comprises a restricted flow outlet adjacent the exterior surface of said diaphragm means, whereby movement of said second diaphragm toward and away from said nozzle variably attenuates the flow of pressure fluid therefrom, thereby varying the back pressure in said pressure tube and hence, at said pressure signal outlet port, in response to the movement of said second diaphragm, and wherein said feedback means comprises pressure transmitting means extending from a point adjacent to and at the same pressure as said signal outlet port to the interior of said chamber.

20. The invention defined in claim 16, wherein said feedback means comprises a pressure divider extending from a point adjacent to and at the same pressure as said signal outlet port to atmosphere, and a pressure tap on said pressure divider connected with said chamber for transmitting a proportionate amount of the pressure drop across said divider to said chamber.

21. The invention defined in claim 16, wherein said nozzle comprises a restricted flow outlet adjacent the exterior surface of said diaphragm means, whereby movement of said second diaphragm toward and away from said nozzle variably attenuates the flow of pressure fluid therefrom, thereby varying the back pressure in said pressure tube and hence, at said pressure signal outlet port, in response to the movement of said second diaphragm, and wherein said feedback means comprises a pressure divider extending from a point adjacent to and at the same pressure as said signal outlet port to atmosphere, and a pressure tap on said pressure divider connected with said chamber for transmitting a proportionate amount of the pressure drop across said divider to said chamber.

References Cited in the file of this patent

UNITED STATES PATENTS

| | | |
|---|---|---|
| 2,856,132 | Chace | Oct. 14, 1958 |
| 2,939,472 | Eller | June 7, 1960 |
| 3,052,064 | Kaeser | Sept. 4, 1962 |